United States Patent [19]
Staempfli

[11] 3,786,464
[45] Jan. 15, 1974

[54] MAXIMUM LEVEL DETECTOR
[76] Inventor: Jackie Staempfli, 20, Rue du Commandant Mouchotte 75, Paris, France
[22] Filed: June 11, 1971
[21] Appl. No.: 152,110

[52] U.S. Cl............... 340/245, 73/308, 73/309, 73/322.5, 340/244 D, 340/244 R
[51] Int. Cl. .......................................... G08b 21/00
[58] Field of Search............ 340/245, 244 D, 244 R; 73/308, 309, 314

[56] References Cited
UNITED STATES PATENTS
| | | | |
|---|---|---|---|
| 892,425 | 7/1908 | Horner | 340/244 B |
| 3,545,272 | 12/1970 | McGill | 340/244 D |

Primary Examiner—Thomas B. Habecker
Attorney—Robert E. Burns and Emmanuel J. Lobato

[57] ABSTRACT

This device for detecting the maximum predetermined level of a liquid in a vessel, for example a bath tub, and warning the user when this level is attained, comprises essentially two elements, i.e., a bottom or reference element retained by gravity at the bottom of the vessel, and a float element remaining by buoyancy at the level of the liquid, and means interconnecting these two elements. These means are either telescopic or flexible, for example in the form of a nylon cord, and the float encloses a circuit comprising a source of current, a switch and a sound and/or luminous signal device. The switch is closed when the float attains the maximum preset level.

3 Claims, 5 Drawing Figures

MAXIMUM LEVEL DETECTOR

BACKGROUND OF THE INVENTION

The present invention relates to devices for detecting the level of a liquid contained in a vessel, notably a bath tub, of the type comprising means adapted to emit a signal for warning the user of the bath tub when the water level therein is at the maximum level preset by the user himself.

DESCRIPTION OF THE PRIOR ART

In all bath tubs, even of the latest types, there is an overflow safety outlet but this outlet permits the escape of only a moderate and insufficient outflow in comparison with the output of the supply faucets. Therefore, except when a tub is filled at a very moderate water output rate, the outlet orifice will only retard the time when the water will flow over the top edge of the tub, so that these overflows cannot be considered as constituting an efficient protection against bathroom floods.

It is already known to use a device for detecting the liquid level in a bath tub, this device comprising a wall fixture carrying an electric contact and a rigid telescopic arm dipping in the top aperture of the bath tub, the lower element of this arm is brought by the user down to a predetermined level so that when the water rises to the level of this element it closes an electric switch. Now this detector is cumbersome, has a poor aesthetic appearance and lacks flexibility. Furthermore, it is objectionable in that it lies almost entirely outside the bath tub and is secured as a permanent fixture to the wall of the bathroom.

It is also known to provide a device for detecting the level of the water contained in a bath tub, wherein a float is adjustably mounted on a rod and adapted to actuate through this rod an electric switch secured to the top edge of the tub. Now this device is not only of scarcely attractive appearance, and cumbersome, but constitutes a source of discomfort for the user; furthermore, a relatively long time is necessary for mounting and removing this device to and from the edge of the tub.

Another known device comprises a float adapted to follow the variation of a liquid mass in a tank between a minimum level and a maximum level, and at the same time to control the opening of a valve for supplying liquid to the tank and another valve for draining this liquid out therefrom. Now this device is responsive to the successive positions assumed by the float in relation to the bottom and cover of said tank, but its flexibility is objectionable in that the device is not adjustable according to the operator's requirements.

SUMMARY OF THE INVENTION

It is the essential object of the present invention to avoid this serious inconvenience by providing a maximum water level detector for use in all bath tubs, this detector being adapted to emit a signal for warning the user if he stays in another room or pays no attention to the tub filling process.

This device for detecting the level of a liquid contained in a vessel, notably a bath tub, comprises a first element floating on the surface of the liquid, a second reference element is retained at the bottom of the vessel. An electric circuit means is enclosed in the first element and comprises: a sound and/or luminous signal device, a source of electric current for energizing said signal device and releasing an alarm signal, and finally a normally open switch inserted between the electric current source and the signal device. Adjustable means interconnect the first floating element and the second reference element. The adjustable means are vertically adjustable and adapted to control the closing of said switch when the distance between the levels of said elements respectively has attained a predetermined value corresponding to the maximum level not to be exceeded in the vessel concerned.

BRIEF DESCRIPTION OF THE DRAWINGS

Typical forms of embodiment of this invention will now be described by way of example with reference to the accompanying drawings in which.

DESCRIPTION OF THE PREFERRED EMBODIMENTS

Figure 1:
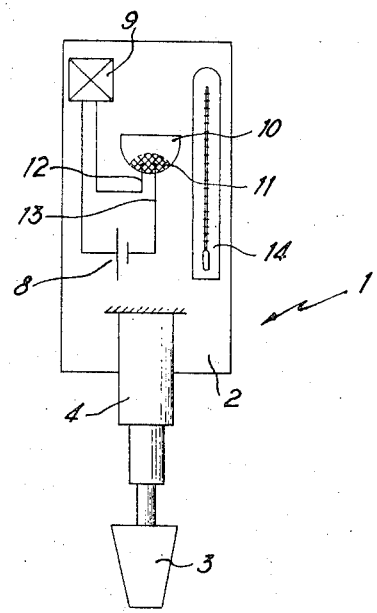
FIG. 1 is a diagrammatic vertical view showing a first form of embodiment of the detector of this invention, wherein the two elements are interconnected by a rigid telescopic arm.

Referring first to FIG. 1, the detector 1 comprises a first floating element 2 and a second element 3 called hereinafter the "reference element," which is retained by gravity at the bottom of the tub. The bottom is therefore, a reference datum. These two elements 2 and 3 are rigidly interconnected by a telescopic tubular rod 4 provided if desired, like the lower portion of the floating element 2, with a scale divided into centimeters or inches, as shown by the reference numeral 5 in FIG. 2.

Figure 2:
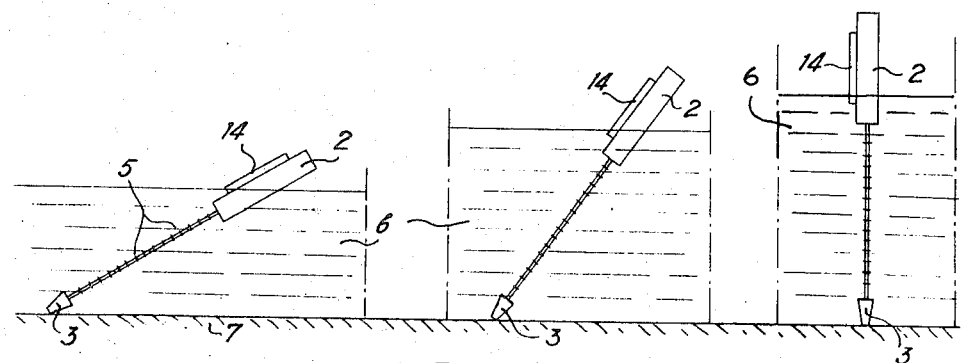
FIG. 2 illustrates the mode of operation of the device in FIG. 1.

By properly adjusting the length of the telescopic rod 4 in relation to the floating element 2, it is thus possible to adjust with precision the maximum permissible water level in the tub. In fact, as shown in FIG. 2, the detector 1 occupies successive positions as a consequence of the increasing buoyancy of the water 6. The weight 3 remains in the bottom 7 of the tub while the first element 2 remains constantly at the water level. Thus, the detector 1 having initially a substantially horizontal position is moved to a substantially vertical position. When the detector 1 is in this substantially vertical position a normally open switch is closed to supply energizing current to an electric circuit comprising a source of energy 8 and a warning or signal device 9.

This warning device 9 may emit a sound or luminous signal which may be continuous or intermittent. Thus, the warning device 9 may consist indifferently of a bell (whether electrical or mechanical) of a member controlling a device reproducing recorded music, laugh or the like, a horn, a chiming device, a motor driving a rattle, or simply a lamp emitting a continous or intermittent light beam in conjunction with, or independently from, the sound signal.

In the detector of FIG. 1 the switch inserted between the power source 8 and the warning or signal device 9 consists of a small cup 10 of at least partially spherical configuration, in which a mercury drop 11 has been placed. When the detector 1 is in a substantially vertical position the mercury 11 will close the gap between a pair of electrodes 12 and 13 welded to the lower portion of cup 10. If desired, the upper of floating element 2 of detector 1 is provided with a thermometer 14.

Figure 3:
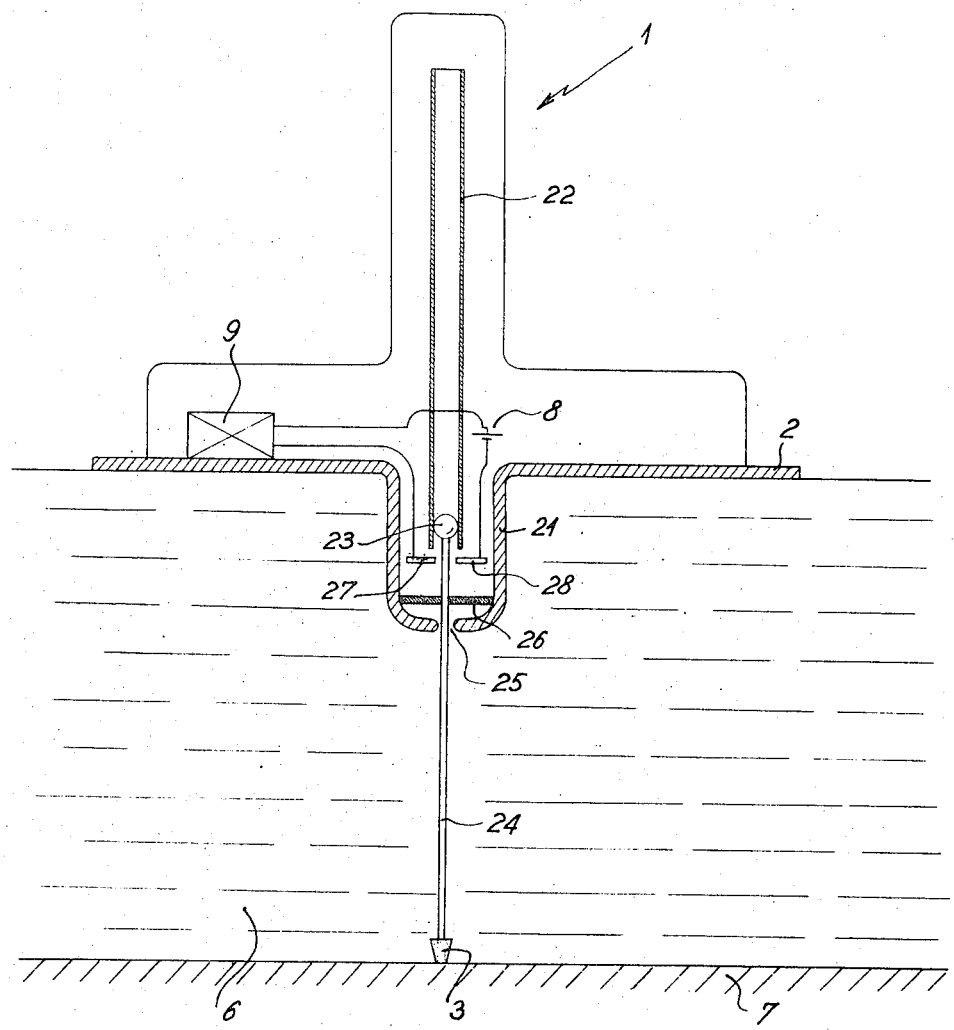
FIG. 3 is a modified form of embodiment of the detector of this invention.

FIG. 3 illustrates a first modified form of embodiment of the detector of this invention. In this alternate form of embodiment the first floating element 2 incorporating the electrical circuit and the ancillary means, and the second element or immersed weight 3, are rigidly interconnected as follows : the floating element 2 carries an internal tubular member 22 in which a ball 23 is adapted to travel without play ; this ball 23 is prevented from falling in the tube 22 by a rod 24 coaxial therewith and adapted to slide freely through an orifice 25 formed at the lower end of the case 21 of floating element 2, the lower end of rod 24 being constantly kept in contact with the bottom 7 of the bath tub by a weight 3 attached to said lower portion. If desired, a seal 26 is provided for preventing water from rising into the first floating element 2. The rod 24, like the rod 4 of the device shown in FIG. 1, is of telescopic type and preset to a length such that when the water rises to a predetermined level in the tub the rod supported ball 23 engages simultaneously the pair of electrodes 27 and 28, thus closing the electrical circuit supplied from the power source 8 to energize the warning or signal device 9.

Figure 4:
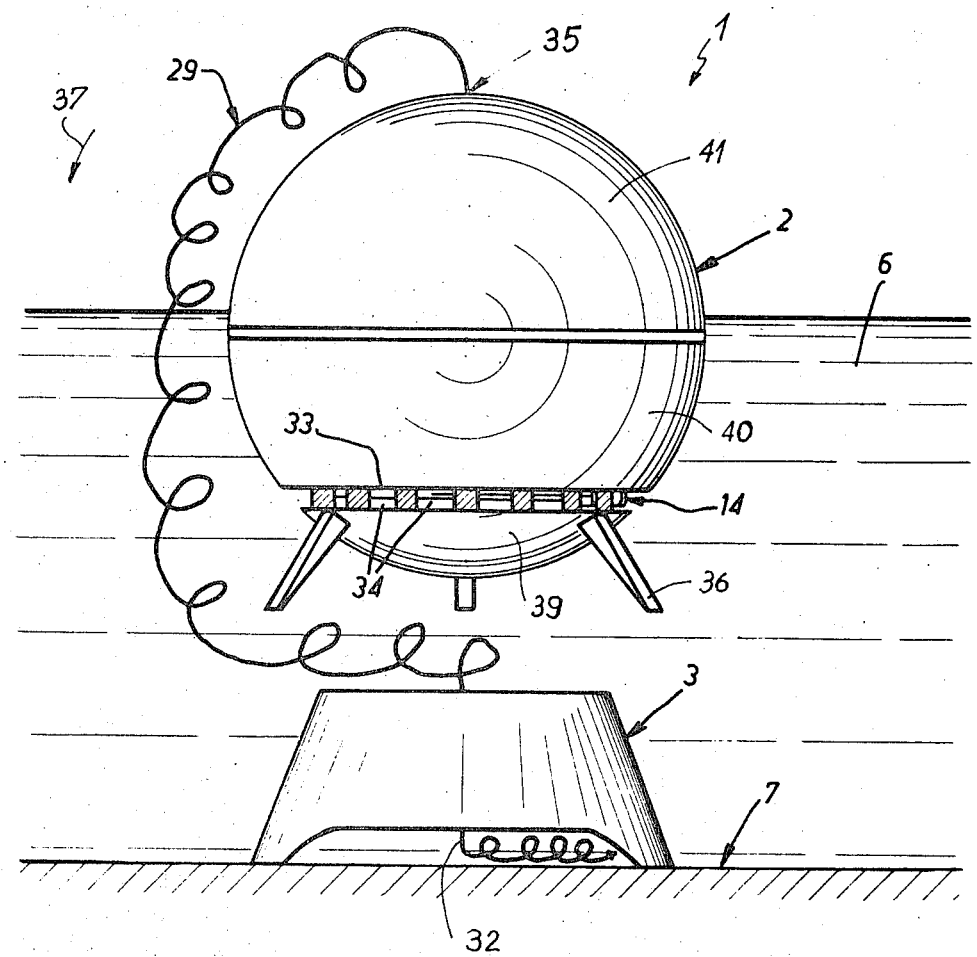
FIG. 4 and 5 are an elevational view and a vertical axial section, respectively, showing another form of embodiment of the detector when the two elements are interconnected by a flexible wire or cord, these Figures corresponding to the inoperative and operative positions, respectively, of the device.
Figure 5:
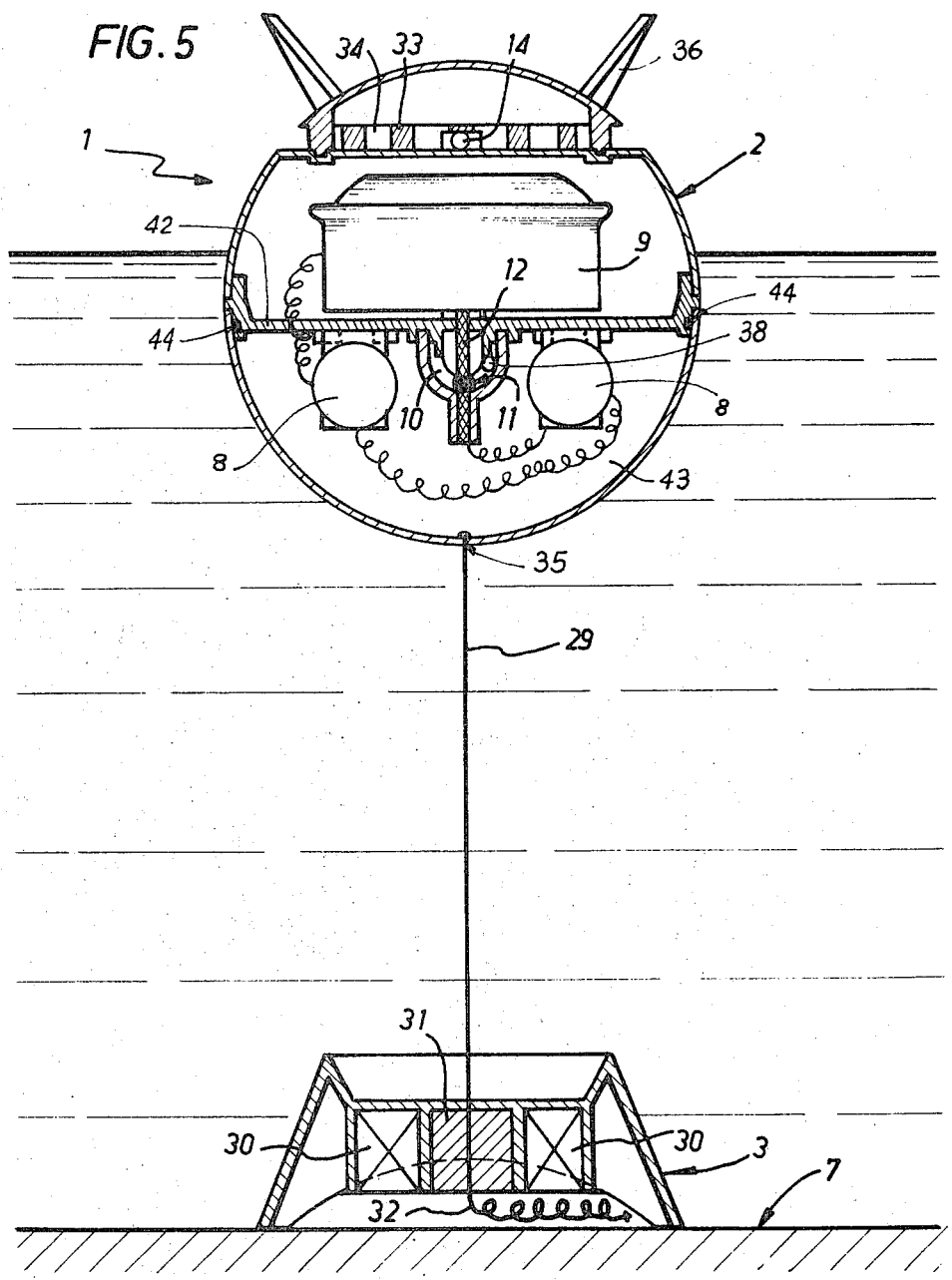

Another modified and particularly advantageous form of embodiment of the device of this invention is illustrated in FIGS. 4 and 5 of the drawings. The first floating element 2 consists in this case of hollow spherical member and the reference immersed element 3 connected by means of a flexible cord 29, for example of nylon, to the float 2, is retained on the bottom 7 of the bath tub by gravity, for example by embeding a ring 30 of high-density metal in said element 3. The flexible cord 29 constitutes an advantageous cheaper substitute for the telescopic rod 4 or 24 of the preceding forms of embodiment and is adjustable in length by means of an elastomeric block 31, for example of rubber, holding the cord 29 by friction along its vertical axis, so as to determine on the one hand the length of the free upper portion of said cord 29 and therefore the maximum level which the liquid may safely attain in the tub, and on the other hand, the length of the useful cord section 32. The cord 29 is attached at one end to the immersed weight 3 at any point and preferably centrally thereof, and on the other hand to the float 2 substantially at the highest possible point 35 of this float when the latter is in its position of equilibrium as shown in FIG. 4.

Under these conditions from the bottom 7 of the tub on which it was supported by its legs 36, the float 2 rises gradually vertically while preserving its initial position which, by construction, is determined as constituting the position of equilibrium by buoyancy. As the float 2 rises in the tub, the flexible nylon cord 29 is moderately tensioned and eventually, when the float 2 attains the maximum, preset or permissible level, the cord 29, of which the upper excess length has been carefully calculated, will be tensioned to a greater degree and thus cause the float to start a slow overturning movement about its center of gravity, as shown by the arrow 37 of FIG. 4.

Then the float 2 will tend to assume another position of equilibrium which is symmetrical to that obtaining under normal or free buoyancy, since it is retained through its anchoring point 35 by the flexible tensioned cord 29 (FIG. 5). When a certain angle of tilt of the float is attained, the mercury drop 11 which was initially in the bottom of the cup 10, i.e., in position 38 shown in dash and dot line, closes the contact between the two electrodes 12 and 13, and thus causes the energization of the signal device in order to warn the user of the bath tub that the desired water level has been attained therein and that the water supply faucets must be turned off.

Of course, this invention should not be construed as being strictly limited by the specific forms of embodiment described and illustrated herein, since many modifications could be brought thereto without departing from the basic principle of the invention as those skilled in the art will readily understand. Thus, more particularly, the detector of FIGS. 4 and 5, constitutes the preferred form of embodiment on account of its simplified construction, good appearance and originality. Briefly, in actual practice, this detector may be constructed as follows (FIGS. 4 and 5) : the floating spherical element 2 is obtained by superposing three compartments, namely a lower compartment 39 of transparent plastic material, an intermediate compartment 40 and an upper compartment 41 both made of opaque plastic material. Enclosed in the upper compartment 41 are the dry batteries 8 constituting the power source, the cup 10 and the electrodes 12 and 13; this assembly is covered with a "floor" forming plate 42 and the necessary water-tightness of the chamber 43 thus obtained is provided for by an O-ring 44. In the intermediate compartment 40 a sound warning device 9 is enclosed ; this device 9 is connected on the one hand to the battery 8 and on the other hand to one of the two electrodes, in this case electrode 12. The sound signal emitted by the warning device 9 when the mercury drop 11 bridges the gap between the electrodes 12 and 13 is facilitated considerably on the one hand by the presence of a flat diaphragm 33 disposed substantially at the level of the lower plane of the intermediate compartment 40, and on the other hand by the presence of perforations 34 formed in the upper portion of the lower compartment 39. For reasons of aesthetics and convenience the thermometer 14 is disposed in the visible portion of float 2 in the operative position thereof, i.e., the thermometer 14 is disposed in the compartment 39 of transparent plastic material.

What I claim and desire to secure by letters patent is:

1. An alarm device for detecting the level of a varying level of liquid in a vessel comprising, a reference means immersible in liquid positioned in use in a vessel for determining a reference datum relative to which a predetermined level of a varying level of liquid increasing in volume in the vessel is to be detected and its attainment indicated, a float means for floating freely on the surface of the liquid in operation as the liquid level changes, means connecting said reference means and said float means to establish said predetermined level of the liquid as a function of a preselected distance between said reference means and said float means, an alarm means in said float means coupled to and actuated by said connecting means for sensing when the relative distance between said reference means and said float means corresponds to said preselected distance and thereby is representative of the attainment of said predetermined level and means responsive to the last-mentioned means for energizing said alarm means to indicate the attainment of said predetermined liquid level.

2. An alarm device for detecting the level of a varying level of liquid in a vessel according to claim 1, in which said means connecting said reference means and said float means comprises means defining variable telescopic means.

3. An alarm device for detecting the level of a varying level of liquid in a vessel according to claim 1, in which said means connecting said reference means and float means comprises variable means for setting individually different predetermined selected levels of said liquid to be detected and indicated.

* * * * *